United States Patent
Huang et al.

(10) Patent No.: US 9,866,928 B2
(45) Date of Patent: Jan. 9, 2018

(54) INTRA-TRANSCEIVER OPTICAL SUPERCHANNEL SWITCHING VIA RF SUB-BAND MULTIPLEXING TECHNIQUE

(71) Applicant: NEC Laboratories America, Inc., Princeton, NJ (US)

(72) Inventors: Yue-Kai Huang, Princeton, NJ (US); Shaoliang Zhang, Princeton, NJ (US); Fatih Yaman, Monmouth Junction, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 14/934,078

(22) Filed: Nov. 5, 2015

(65) Prior Publication Data
US 2016/0191168 A1   Jun. 30, 2016

Related U.S. Application Data

(60) Provisional application No. 62/082,710, filed on Nov. 21, 2014.

(51) Int. Cl.
*H04B 10/61* (2013.01)
*H04B 10/516* (2013.01)
*H04Q 11/00* (2006.01)
*H04J 14/02* (2006.01)

(52) U.S. Cl.
CPC ....... *H04Q 11/0001* (2013.01); *H04B 10/516* (2013.01); *H04B 10/613* (2013.01); *H04B 10/616* (2013.01); *H04B 10/6166* (2013.01); *H04J 14/0298* (2013.01)

(58) Field of Classification Search
CPC ............... H04B 10/616; H04B 10/6166; H04J 14/0298
See application file for complete search history.

(56) References Cited

U.S. PATENT DOCUMENTS

| | | | |
|---|---|---|---|
| 2008/0051038 A1* | 2/2008 | Hindson | H04B 1/0466 455/73 |
| 2009/0047023 A1* | 2/2009 | Pescod | H04B 10/25753 398/115 |
| 2014/0003559 A1* | 1/2014 | Pullela | H04L 1/0091 375/343 |
| 2014/0126905 A1* | 5/2014 | Yonenaga | H04B 10/506 398/48 |

* cited by examiner

*Primary Examiner* — Nathan Curs
(74) *Attorney, Agent, or Firm* — Joseph Kolodka

(57) ABSTRACT

Systems and methods are disclosed for data communication by performing RF sub-band multiplexing and demultiplexing by cascading a radio-frequency (RF) mixing module and optical dual-polarized (DP) QPSK modulator for hybrid RF/optical IQ modulation; and performing intra-transceiver optical superchannel switching through the RF sub-band multiplexing.

15 Claims, 11 Drawing Sheets ial sub-banding scheme which relies on "digital transmitters" to convert the digitally generated and multiplexed sub-bands to baseband signal through high-speed DAC. There are two challenges for adopting digital sub-banding scheme: First, compare to the single carrier (one sub-band), which is the standard industry DSP platform, it would require huge investment from the chip designer to develop new DSP to achieve digital sub-banding for the added benefit. Secondly, if optical switching is applied, the sub-band granularity will also be limited by the WSS resolution as discussed earlier. Switching can also be done via OEO technique, where an additional transceiver is used to first recover all the sub-bands and then drop/switch the sub-bands accordingly. This will significantly increase the system cost for ROADM design.

INTRA-TRANSCEIVER OPTICAL SUPERCHANNEL SWITCHING VIA RF SUB-BAND MULTIPLEXING TECHNIQUE

This application claims priority to Provisional Application Ser. No. 62/082,710 filed 2014 Nov. 21, the content of which is incorporated by reference.

BACKGROUND

The present invention relates to ultra-wide band optical digital coherent detection.

For beyond 100 GbE technology development, optical superchannel has been one of the attractive options. Optical superchannel employs multi-carrier transmission to scale the channel capacity to 400-Gb/s, 1-Tb/s, or above, while managing the subcarrier spacing effectively so the spectral efficiency for fiber communication can be much improved from conventional DWDM with fixed channel spacing. However, the reduced subcarrier/channel spacing within an optical superchannel poses new challenges to perform optical switching on the subcarriers within the superchannel. Conventional optical wavelength selective switches (WSS) have switching resolution limit typically between 12.5~50 GHz, therefore cannot handle subcarrier switching in superchannel design where guard bands are typically smaller than 5 GHz.

There are two major categories for subcarrier switching within optical superchannel: inter-transceiver superchannel switching and intra-transceiver superchannel switching. For inter-transceiver switching, each optical subcarrier will be generated and detected using separate transceiver, thus the switching will have to be done at the granularity of each transceiver's operating baud-rate. Since system designer will want to lower the cost per transmitted bit by increasing of transceiver data rate and reducing the number of RF and optical components (i.e. drivers, modulators, and photodiodes), only coarse granularity can be achieved for inter-transceiver switching. Therefore it has lower flexibility for network grooming/switching is low, and more suited for submarine/long-haul where traffic patterns are stable. The main stream method to achieve inter-transceiver switching is to use flexible-band WSS on Nyquist-shaped subcarriers, where the minimal spacing or guard-band is limited by the spectral resolution of the WSS. Very high spectral resolution WSS has been demonstrated for reduction of achievable subcarrier guard-band at the expense of reducing the WSS bandwidth, which will significantly increase the cost and complexity of ROADM design. There are also several proposals for subcarrier switching for all-optical (AO) OFDM superchannel. AO-OFDM has not been adopted by the industry due to its higher cost and inferior performance compare to Nyquist signaling. The switching for AO-OFDM is also not very practical due to the added complexity of optical carrier phase recovery via optical phase-lock loop.

For intra-transceiver switching, each superchannel is consisted of one or multiple optical subcarriers containing finer electrical subcarrier/subbands, thus grooming/switching can be done at portions of each transceiver's data-rate. The finer granularity will promote greater network flexibility and is suitable for adaptation to dynamic traffic patterns and spectrum utilization, as the case in metro/access networks. Other than enhanced flexibility, there are also potential benefit of improved transmission performance as lower fiber nonlinearity distortion can be achieved at certain sub-band granularity which is less than the standard transceiver baud-rate of 32 GHz. Previous demonstrations typically focus on digital

SUMMARY

In one aspect, systems and methods are disclosed for data communication by performing RF sub-band multiplexing and demultiplexing by cascading a radio-frequency (RF) mixing module and optical dual-polarized (DP) QPSK modulator for hybrid RF/optical IQ modulation; and performing intra-transceiver optical superchannel switching through the RF sub-band multiplexing.

Electrical sub-banding for optical transmission can be achieved by multiplexed and demultiplexed multiple baseband signals using hybrid IQ modulation with of RF mixers and optical modulators. Intra-transceiver superchannel can be generated and detected using RF sub-banding method without the use of new DSP design. Moreover, the optical frequency of each sub-band relative to the optical carrier can be tuned and swapped by controlling the frequencies as well as the phase of the RF LO during the mixing process.

In terms of node switching function, the RF sub-banded superchannel can undergo traditional optical switch method using WSS with the same limitation on reserved spectral guard band due to WSS resolution. However the big advantage is that sub-band switching can be done using OEO without DSP. By using the same RF sub-band multiplexing and demultiplexing technology in conjuncture with sharp electronic filtering, which has much higher resolution than optical WSS, adding or dropping sub-bands can be achieved.

Advantages of the system may include one or more of the following. The system facilitates the generation and detection of intra-transceiver superchannel using multiple lower-baud rate electrical baseband signals. The bandwidth of each sub-band is still dependent on the available DSP speed, however the transceiver cost from components such as drivers, modulator, and laser can be shared for multiple sub-bands for cost reduction. The RF sub-band multiplexers are based on passive wideband mixer technology which has relatively lower cost and size compared to active components used for E/O conversion. Compare to digital sub-banding, the RF sub-banding techniques allows intra-transceiver superchannel generation without altering the current DSP design. Furthermore, the bandwidth of each optical transceiver is no longer limited by the DAC/ADC speed, thanks to the wide band operation of RF IQ mixers in the sub-band multiplexers and demultiplexers. For node switching, the method allows the use of electrical low-pass filters, which typically have much higher resolution than optical WSS, in conjunction with RF sub-band demultiplexing and multiplexing. This will support smaller sub-band spacing and improve system capacity. Different from digital sub-banding as well, however, is that the method does not require DSP during OEO switching therefore the cost can be lowered. The approach is independent of the generation method of the electrical baseband signal, and most importantly, the method is compatible with standard ~32 Gbaud rate which all the current commercial 100G/200G DSP chips operate at. The method is also modulation format independent so it is flexible and can be adopted for different system design with specific spectral efficiency or reach requirements. It also allows a single transceiver to be shared for different applications, such as designating sub-bands with different modulation formats to support either long reach or high data-rate application requirements.

BRIEF DESCRIPTION OF THE DRAWINGS

The drawing and figures depict one or more implementations in accord with the present concepts, by way of example only, not by way of limitations. In the figures, like reference numerals refer to the same or similar elements.

DESCRIPTION

Figure 1:
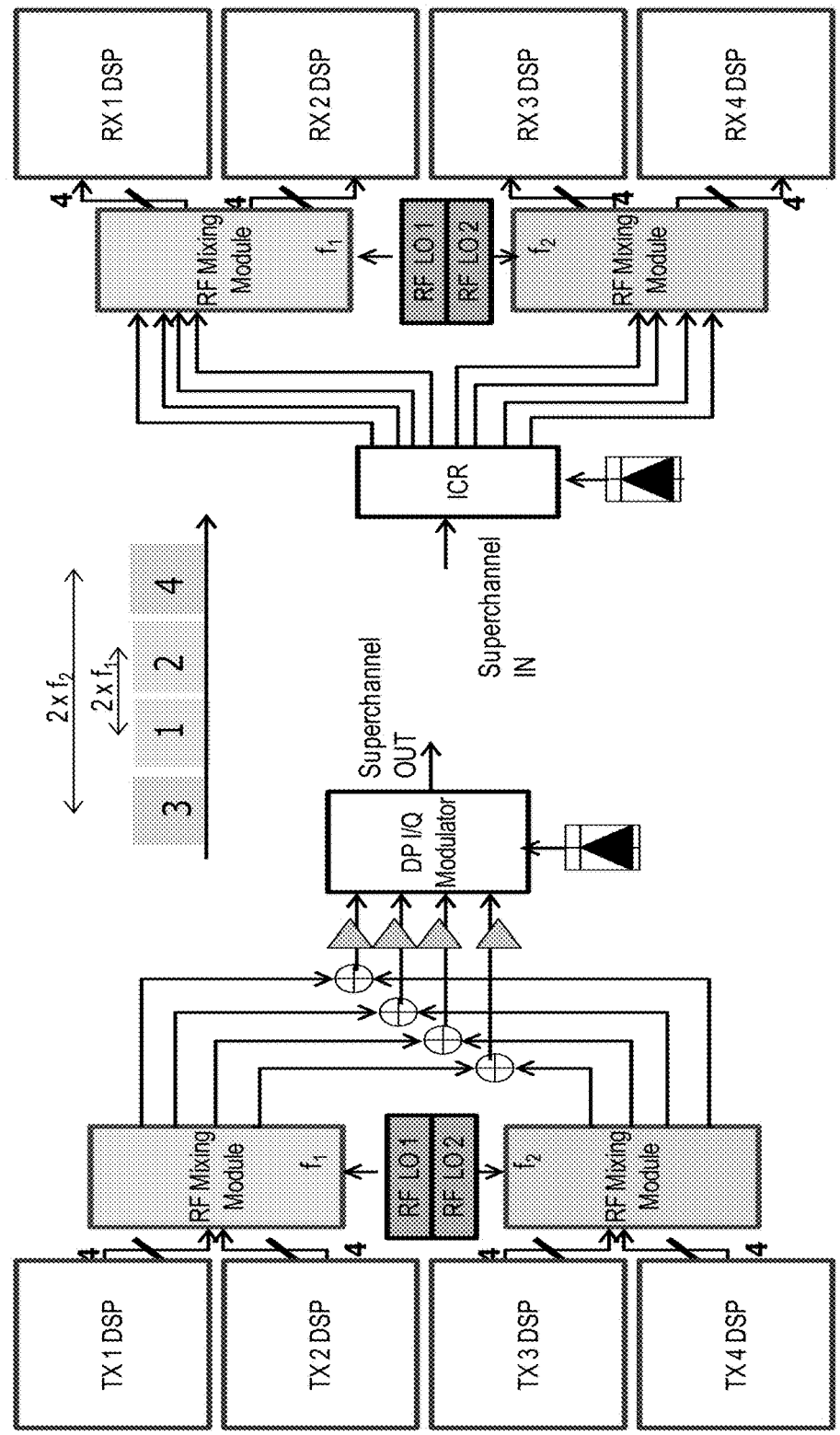
FIG. 1 shows an exemplary schematic to generate and receive intra-transceiver superchannel using RF subband multiplexing technology.

FIG. 1 shows an exemplary schematic to generate and receive intra-transceiver superchannel using RF subband multiplexing technology. FIG. 1 shows the overall schematic of the system for processing the sets of electrical baseband input signals from separate DSP cores 1-4. RF sub-band multiplexing and demultiplexing can be achieved via cascading the RF mixing module and optical dual-polarized (DP) QPSK modulator to perform hybrid RF/optical IQ modulation. By using two or more sets of RF mixing module with to allow multiple parallel RF up-conversions (down-conversions) with different local oscillator (LO) frequencies, more RF sub-bands can be multiplexed (demultiplexed).

Figure 2:
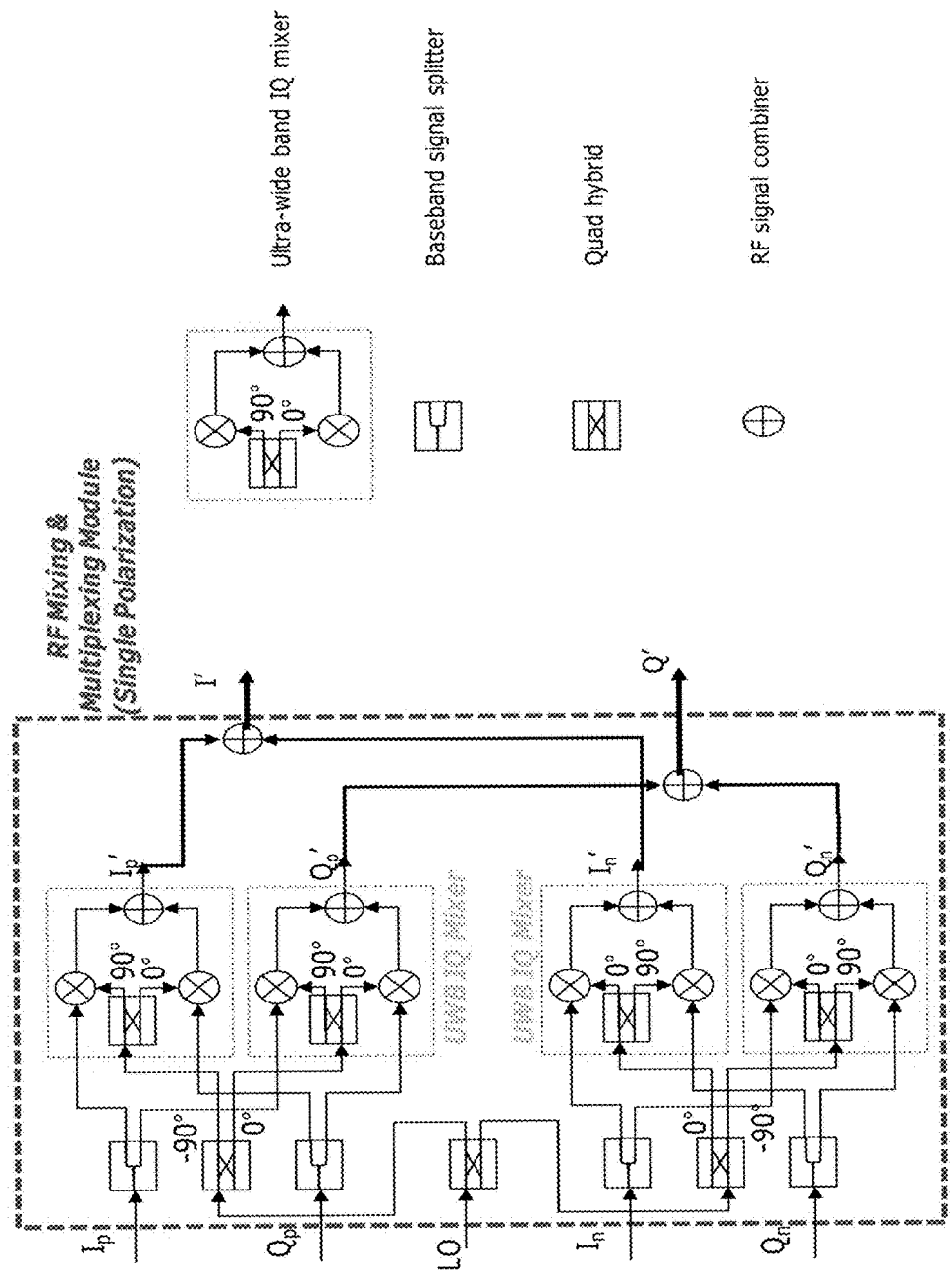
FIG. 2 shows an exemplary structure of RF mixing/multiplexing module for single polarization.

FIG. 2 shows an exemplary structure of RF mixing/multiplexing module for single polarization. FIG. 2 shows the detail structure of a RF multiplexing module for RF sub-band processing in one polarization. For dual polarization operation, two modules can be used for parallel processing on two polarizations. The operation principle of these modules was well explained in the previous invention entitled "Ultra-wide band signal generation using digitally jointed dual sidebands and RF up-conversion for single optical carrier transmission," with Ser. No. 14/689,094, the content of which is incorporated by reference. For summary, the up-converted I' and Q' RF signal outputs will have the following relationship with the baseband inputs ($I_n$, $Q_n$, $I_p$, $Q_p$):

$$I'=(I_p+I_n)\cdot\cos(2\pi f_{LO}t)+(-Q_p+Q_n)\cdot\sin(2\pi f_{LO}t) \quad (1)$$

$$Q'=(I_p-I_n)\cdot\sin(2\pi f_{LO}t)+(Q_p+Q_n)\cdot\cos(2\pi f_{LO}t) \quad (2)$$

Figure 3A:
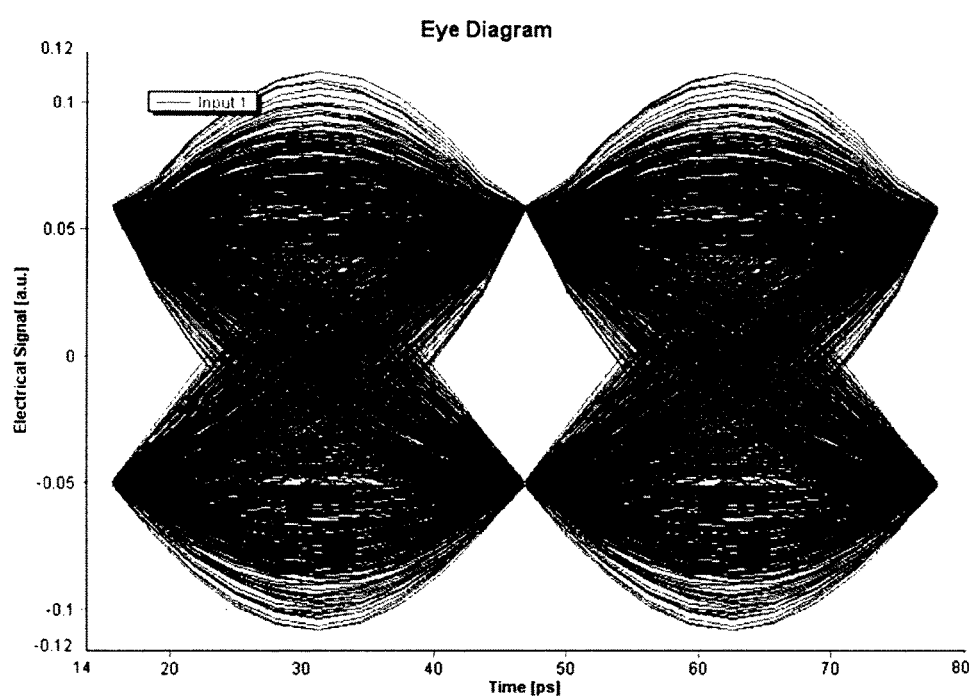
FIGS. 3A-3F show exemplary simulated diagrams of signals generated by various components of the system.
Figure 3B:
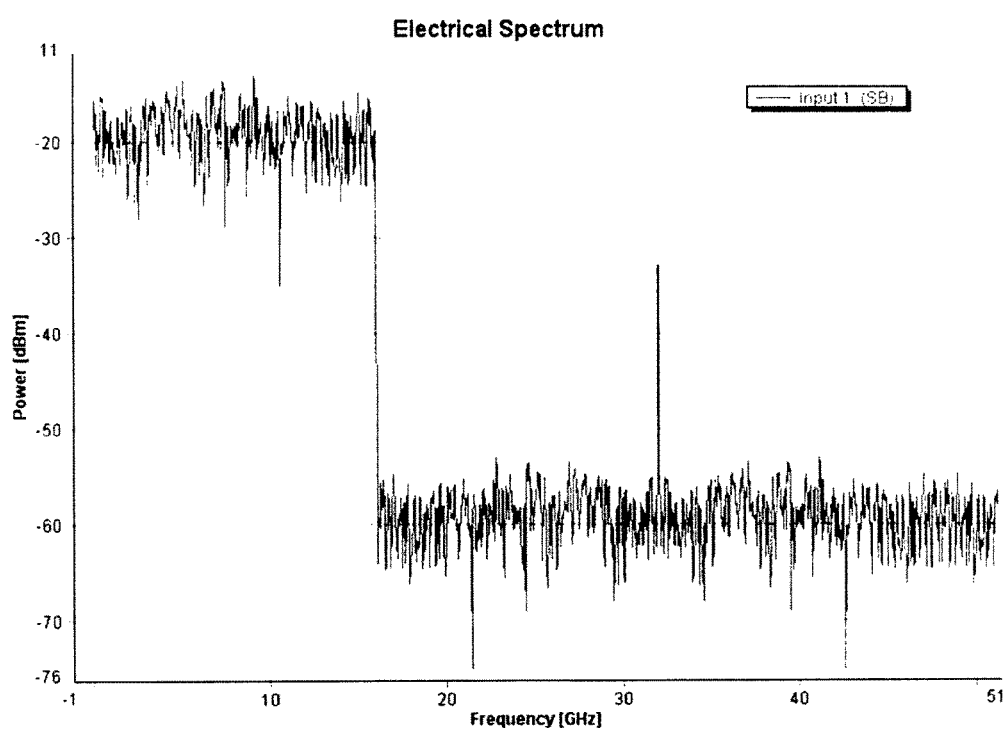
Figure 3C:
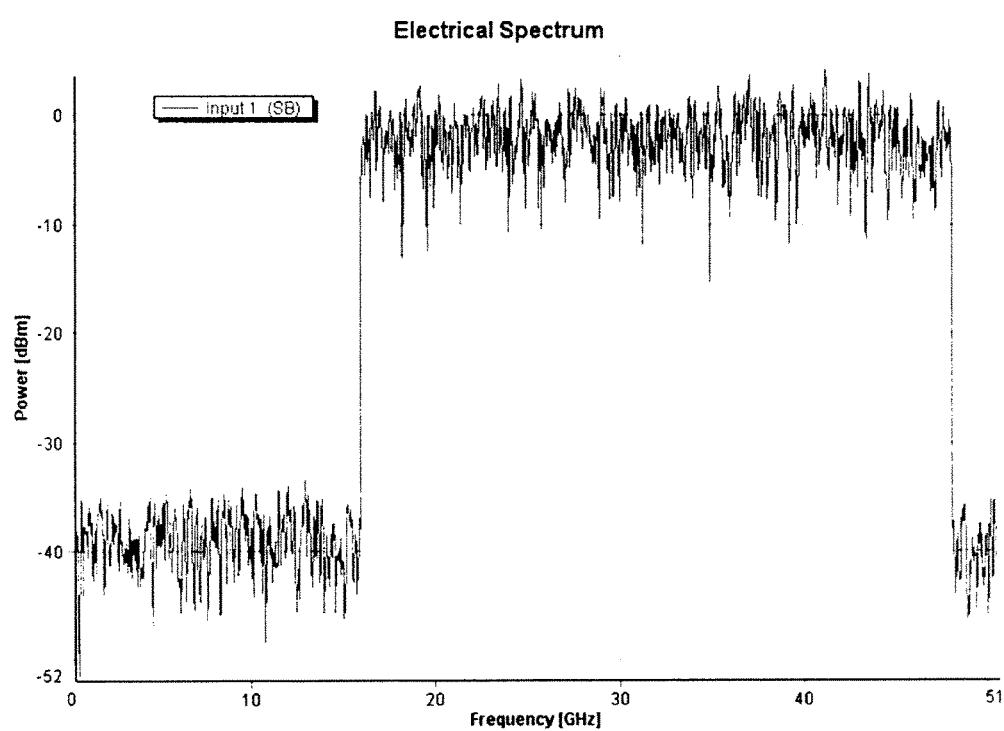
Figure 3D:
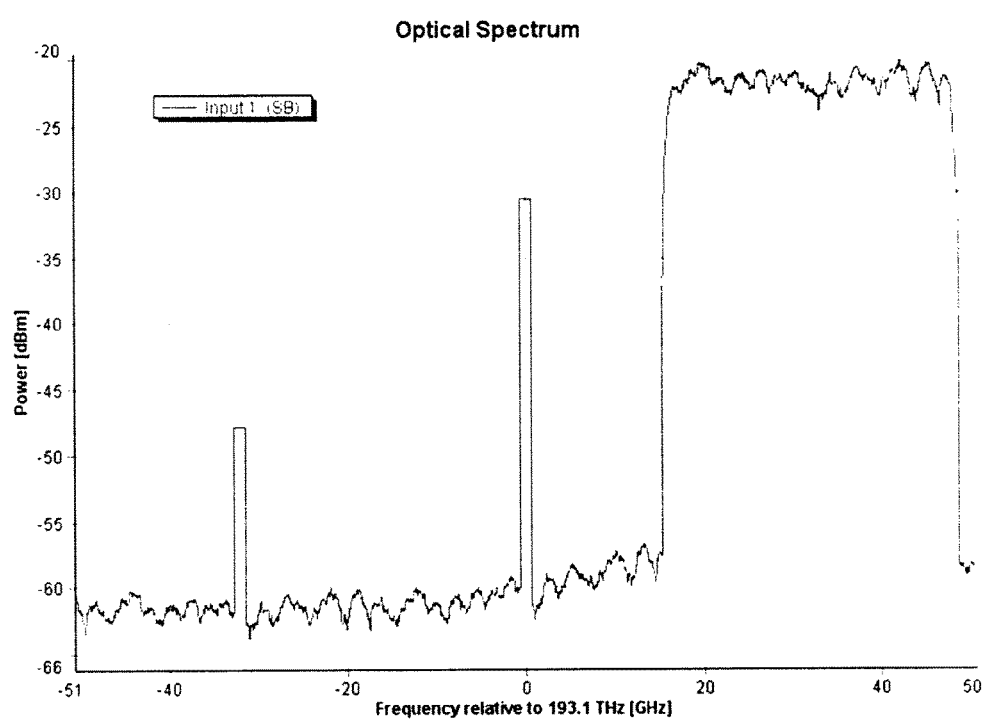
Figure 3E:
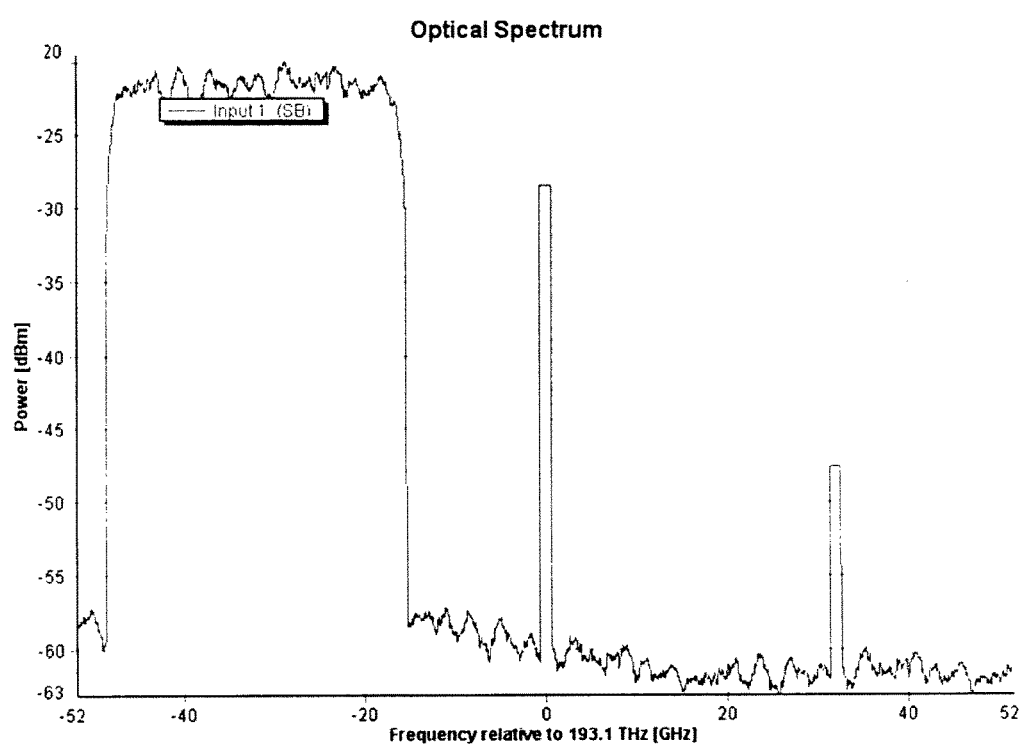
Figure 3F:
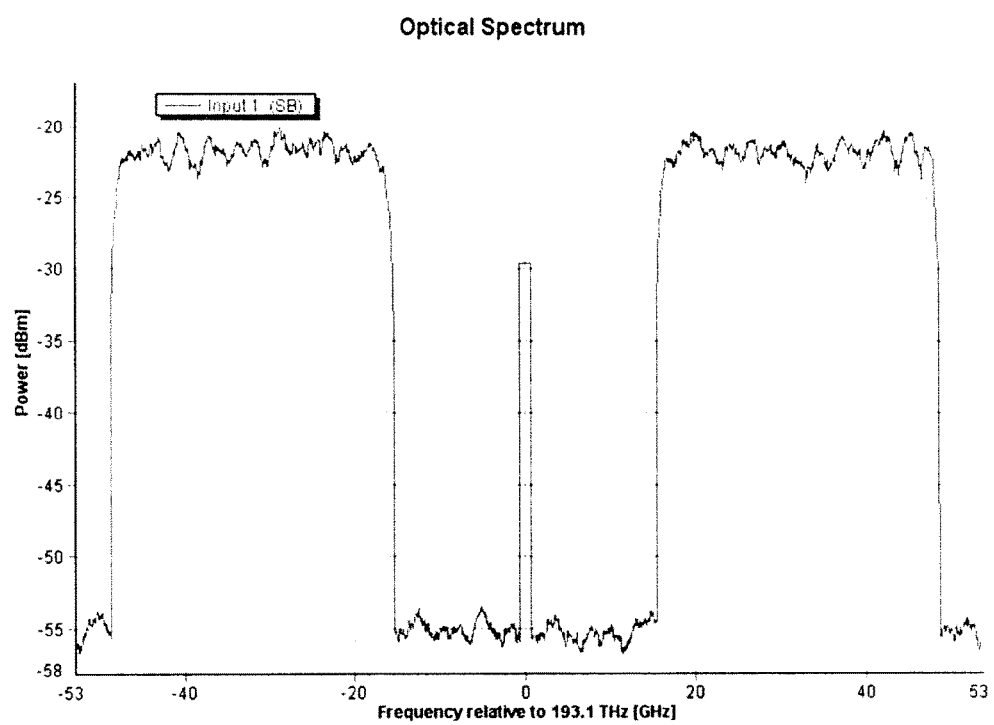
Figure 4A:
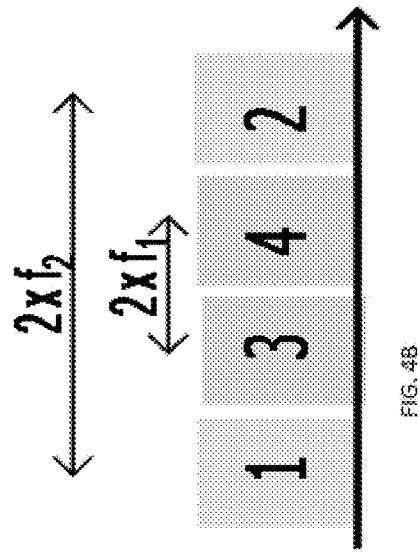
FIGS. 4A-4D show different RF sub-band arrangements via means of swapping RF LO frequencies and adjusting LO phases inside the RF mixing module.
Figure 4B:
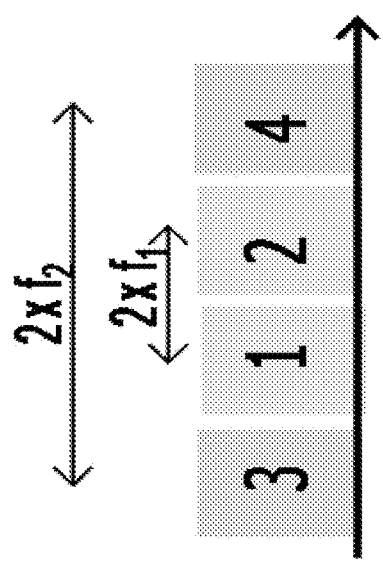
Figure 4C:
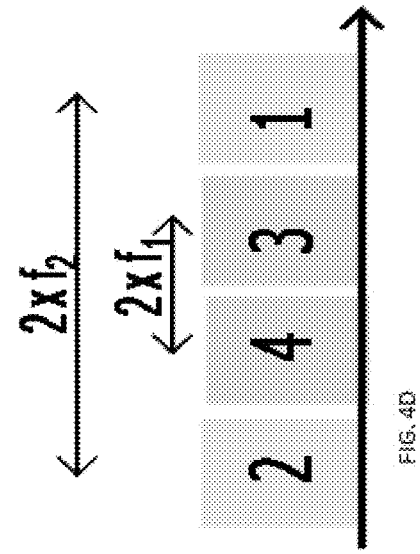
Figure 4D:
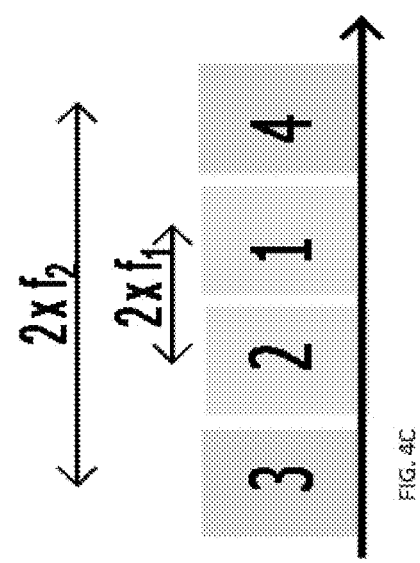

When the two up-converted and combined RF signals are used to drive the I and Q arms of the I/Q modulator, and the output of which will be a double side-band signal containing two RF sub-bands in one polarization. The separation between the two RF sub-bands, $f_{spacing}$, is twice of the RF LO frequency $f_{LO}$. FIGS. 3A-3F shows exemplary diagrams of signals generated by various components of the system that illustrates the operation of RF sub-band multiplexing by simulation plots: FIG. 3A shows a simulated eye diagram of baseband signal generated by digital transmitter; electrical spectrum of FIG. 3B the baseband signal and FIG. 3C the up-converted RF mixing module output; optical spectrum containing FIG. 3D only the positive sub-band, FIG. 3E only the negative sub-band, and FIG. 3F both sub-bands. FIG. 3 FIG. 3(a) is the eye diagram of a binary 2-level signal running at 32-Gbaud, typically used for DP-QPSK or DP-BPSK transmission for current 100 GbE systems. The Nyquist-shaped baseband signal has a sharp signal cut-off at 16 GHz, as shown in FIG. 3B. By setting the LO frequency to 32 GHz, the baseband signals is up-converted to 16~48-GHz after I/Q mixing at the RF mixing modules outputs, shown in FIG. 3(c). When two arms of IQ modulator were driven with RF mixing module outputs, the baseband signals ($I_n$, $Q_p$) will be converted to the positive side of the optical carrier while ($I_n$, $Q_n$) will be converted to the negative side, as depicted in FIGS. 4D and 4E. By supplying all the baseband lanes ($I_n$, $Q_p$, $I_n$, $Q_n$), two RF sub-bands will be generated after the hybrid RF/photonic IQ modulation, as shown in FIG. 3F.

Figure 5:
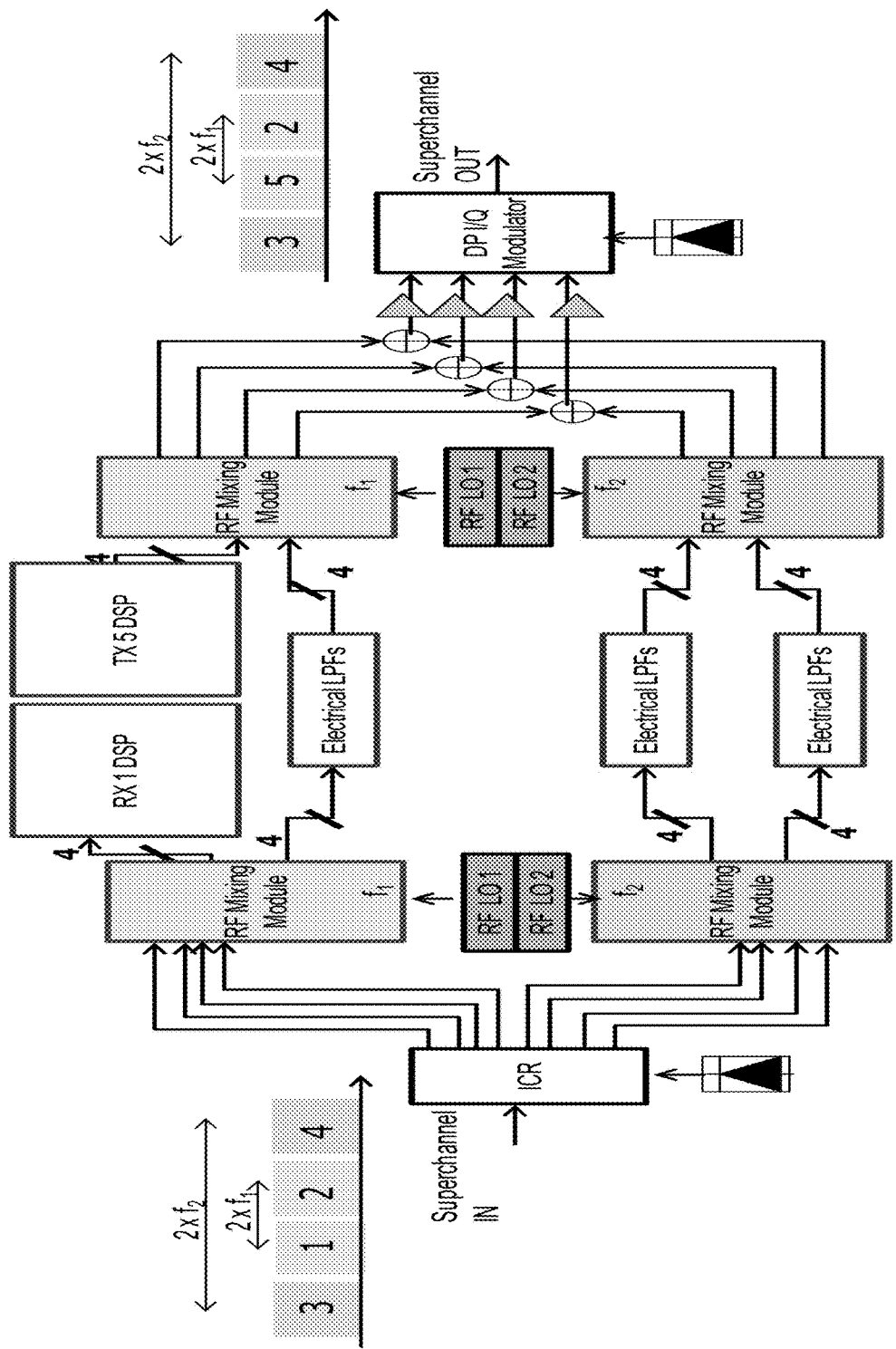
FIG. 5 shows an example of node switching architecture for superchannel containing multiple RF sub-bands using OEO, RF mixing modules, and electrical LPFs.

FIG. 4 shows different RF sub-band arrangements via means of swapping RF LO frequencies and adjusting LO phases inside the RF mixing module, while FIG. 5 shows an example of node switching architecture for superchannel containing multiple RF sub-bands using OEO, RF mixing modules, and electrical LPFs.

Going back to FIG. 1, it is now clear that the location of RF sub-bands can be re-arranged by adjusting the LO frequency and the tuning the LO phase inside the RF mixing module during multiplexing and demultiplexing. For example, by swapping the LO frequencies to top and bottom RF mixing modules, one can re-arrange the lay-out of the RF sub-bands from FIG. 4A to FIG. 4B. By viewing FIG. 2 and examining equations (1) and (2), we can identify that the factor which creates the positive and negative sub-bands is the phase differences of the LO used for creating the up-converted I' and Q' signal, which has a 90° leading phase for positive sub-band while a 90° lagging phase for negative sub-band. This characteristic can also be utilize for sub-band re-arrangement. By swapping the leading and lagging LO phases in the top RF mixing modules, we can obtain the arrangement in FIG. 4C. Finally, both frequency and phase tuning techniques can be applied and FIG. 4D shows one example of such.

FIG. 5 illustrates an example of node switching architecture for intra-transceiver superchannel with multiple RF sub-bands. In this example, one RF sub-band is dropped after RF IQ demultiplexing, and a new RF sub-band is added in its original location. The other by-pass RF sub-bands are filtered at the baseband after RF IQ demultiplexing to remove the cross-talks from adjacent sub-bands. The baseband signals for the by-passing sub-bands are then re-modulated using hybrid RF/photonics IQ modulation without DSP for data recovery. This is possible through the method of direct signal translation described in another previous invention entitled "Ultra-wide range optical wavelength converter by direct signal translation from integrated coherent receiver to dual-polarization IQ modulator." Note that this is only one example of the switching function, and any combination of the input sub-bands can be dropped while any combination of the frequency location for output sub-bands can be achieved using LO frequency and phase swapping as described earlier. It is also to be noted that large optical frequency conversion can also be achieved through changing the optical frequency of the laser input to the DP I/Q modulator.

Figure 6:
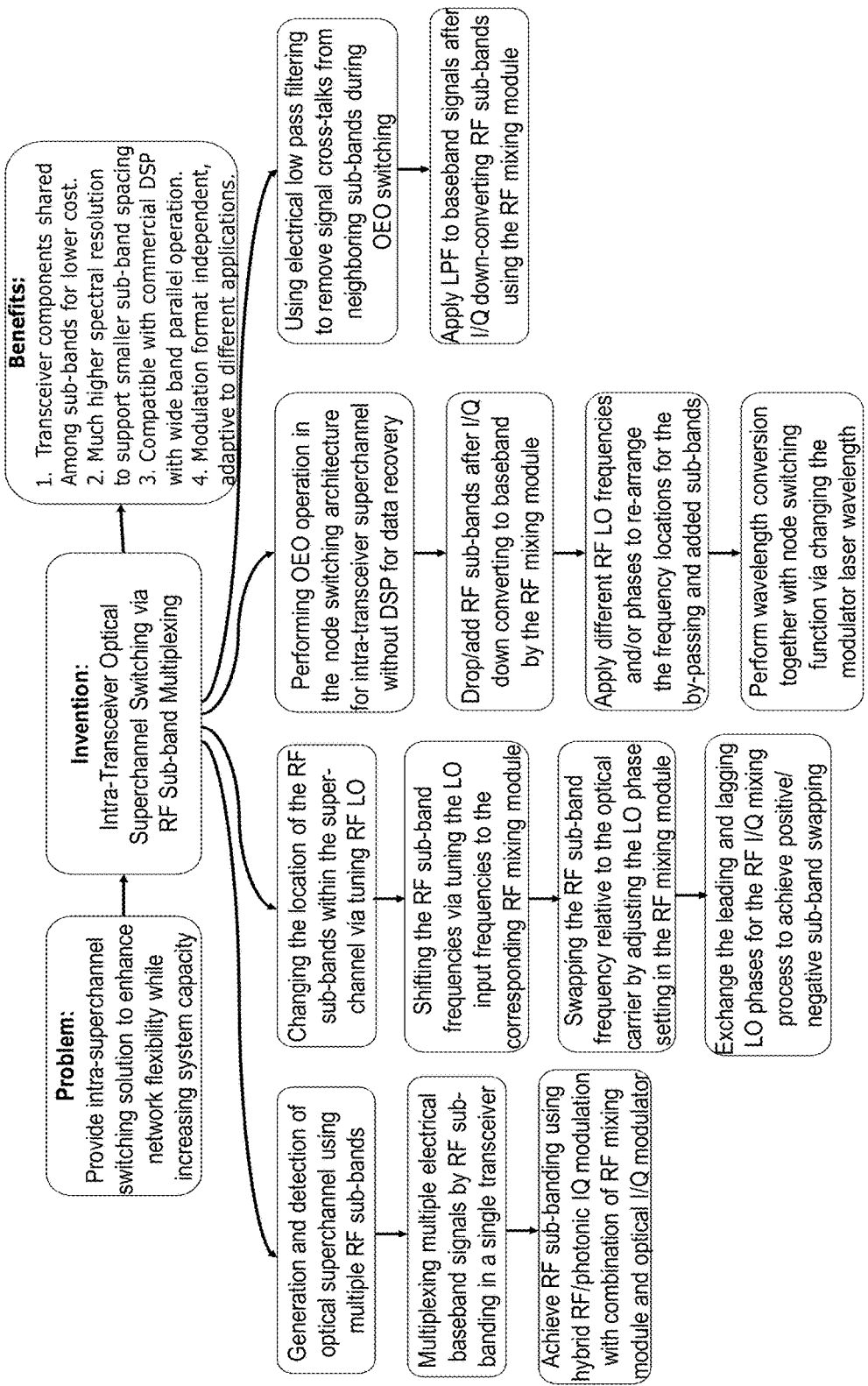
FIG. 6 shows an exemplary operation in accordance to one aspect of the invention.

FIG. 6 shows an exemplary operation in accordance to one aspect of the invention. The process is significantly different from prior arts due to the generation and detection of optical superchannel using multiple RF sub-bands. Multiple RF sub-bands can be multiplexed using hybrid RF/photonic IQ modulation with combination of RF mixing module and optical I/Q modulator. The frequency arrangements of the RF sub-bands within one superchannel transceiver can be modified via means of changing the RF LO frequencies as well as the LO phase settings inside the RF mixing module. The flexibility to rearrange sub-bands allows intra-transceiver superchannel switching to be performed.

In the system, the intra-transceiver superchannel multiplexing and switching via RF sub-banding involves strictly analog signal processing, therefore no new DSP development for the sub-banding process is required, potentially reducing initial system development cost. Other than the cost factor, typically DSP will incur additional latency for data transmission, making the solution more attractive in speed-sensitive applications.

By using electrical LPF on the down-converted baseband signals for node switching, we can potential improve the system capacity by reducing guard band between sub-bands, since electrical LPFs typically have much higher resolution than optical WSSs used in ROADM design. The flexibility of electrical LPF BW can be one potential concern. However, since it is likely that the industry will adopt Nyquist-shaped signals with ~32-GHz baud-rate for most coherent system platform, the electrical LPF BW doesn't necessarily need to be flexible. It is to be noted that the RF sub-band switching scheme can be used in conjucture with existing WSS technology as well. Thus the BW flexibility could be supplied by the WSS.

Aspects of the systems and methods provided herein encompass hardware and software for controlling the relevant functions. Software may take the form of code or executable instructions for causing a DSP or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A method for data communication, comprising
performing RF sub-band multiplexing by cascading a radio-frequency (RF) mixing module and optical dual-polarized (DP) modulator for hybrid RF/optical IQ modulation;
combining analog RF mixing components and coherent optical transceivers to provide multi sub-band transmission for an optical wavelength using coherent transmission with different base-bands IQ signal, each with separate I/Q real value lanes;
changing RF sub-bands within a superchannel and exchanging leading and lagging LO phases for RF IQ mixing to achieve positive or negative sub-band swapping; and
performing intra-transceiver optical sub-band switching through the RF sub-band multiplexing.

2. The method of claim 1, comprising using four or more sets of RF mixing module as multiple parallel RF up-conversions/down-conversions with different local oscillator (LO) frequencies to add RF sub-bands to be multiplexed/demultiplexed.

3. The method of claim 1, comprising detecting an optical superchannel using a plurality of RF sub-bands.

4. The method of claim 3, comprising multiplexing a plurality of electrical baseband signals by RF sub-banding in a single transceiver.

5. The method of claim 3, comprising performing RF sub-banding using a hybrid RF-photonic IQ modulation with a combination of RF mixing and optical IQ modulating, where I is an in-phase component of the waveform, and Q represents a quadrature component.

6. The method of claim 1, comprising tuning an RF local oscillator (LO).

7. The method of claim 6, comprising shifting the RF sub-band frequencies by tuning LO input frequencies to a corresponding RF mixing.

8. The method of claim 6, comprising swapping an RF sub-band frequency relative to an optical carrier by adjusting an LO phase setting in RF mixing.

9. The method of claim 1, comprising performing OEO operation for intra-transceiver superchannel for data recovery.

10. The method of claim 1, comprising dropping or adding RF sub-bands after IQ down conversion to baseband by an RF mixer.

11. The method of claim 1, comprising applying different RF LO frequencies or phases to rearrange frequency locations for bypassed and added sub-bands.

12. The method of claim 1, comprising electrically low-pass filtering (LPF) to remove signal cross-talks from neighboring sub-bands during OEO switching.

13. The method of claim 1, comprising applying LPF to baseband signals after IQ down converting RF sub-bands.

14. The method of claim 1, comprising tuning and swapping an optical frequency of each sub-band relative to an optical carrier by controlling frequencies and phases of RF LOs during mixing.

15. The method of claim 1, wherein up-converted I' and Q' RF signal outputs comprise a relationship with baseband inputs ($I_n$, $Q_n$, $I_p$, $Q_p$):

$$I'=(I_p+I_n)\cdot\cos(2\pi f_{LO}t)+(-Q_p+Q_n)\cdot\sin(2\pi f_{LO}t) \text{ and}$$

$$Q'=(I_p-I_n)\cdot\sin(2\pi f_{LO}t)+(Q_p+Q_n)\cdot\cos(2\pi f_{LO}t).$$

* * * * *